United States Patent Office.

REBECCA J. WALKER, OF GOSHEN, OHIO.

Letters Patent No. 105,526, dated July 19, 1870.

IMPROVED MODE OF PROTECTING FRUIT-TREES FROM CURCULIO, &c.

The Schedule referred to in these Letters Patent and making part of the same.

To all whom it may concern:

Be it known that I, REBECCA J. WALKER, of Goshen, in the county of Clermont and State of Ohio, have invented a new and improved Mode for Protecting Fruit-Trees from the Curculio; and I do hereby declare that the following is a full and exact description of the same.

This invention consists in the application of various ingredients hereinafter named, to the bases of fruit-trees, for the purpose of protecting them from the ravages of the curculio.

My method is as follows:

First, apply common salt about the base of the tree, upon the ground beneath the fruit-bearing limbs, about one quart to a tree, and rake this well in.

Second, put down a hard surface of flat stone, brick, round stone, or large gravel, leaving a space between each piece.

Third, fill these spaces with strong ashes, which should be well beaten in.

Fourth, spread over this a thick wash of white lime.

Fifth, apply daily, or every other day, urine from the stable, or chamber-lye from the house.

This damping process should be continued until the fruit is well grown.

In practice, the foregoing method has invariably succeeded in accomplishing the desired result.

Having thus fully described my invention,

What I claim as new, and desire to secure by Letters Patent, is—

The method herein described of protecting fruit-trees from the curculio.

This specification signed and witnessed this 27th day of November, A. D. 1869.

REBECCA J. WALKER.

Witnesses:
WM. YOST,
MAGGIE MCKINNIE.